Patented Apr. 11, 1939

2,154,190

UNITED STATES PATENT OFFICE 2,154,190

SOLVENT REFINING AND DEWAXING OF OILS

James W. Weir, Los Angeles, Calif., assignor, by mesne assignments, to Edeleanu Gesellschaft, m. b. H., Berlin, Germany, a corporation of Germany No Drawing. Application June 8, 1936, Serial No. 84,164

18 Claims. (Cl. 196—13)

This invention relates to the art of refining hydrocarbon oils for the purpose of removing from the oil wax and hydrocarbon constituents of relatively low "viscosity index."

In the refining of lubricating oil by solvent extraction, the oil and solvent are mixed in such proportions as to give two different phases, the one consisting mainly of paraffinic oil, in which a small percentage of the selective solvent is dissolved; and the other consisting largely of solvent in which the naphthenic and aromatic fractions of the lubricating stock are in solution.

After these two phases are agitated sufficiently to insure equilibrium or until there is no further exchange of components between phases, the mixture is then passed into a quiescent settling zone for the purpose of permitting stratification to occur so that respective phases may be decanted or withdrawn with as little contamination with the other phase as possible under practical conditions.

I have observed the conditions existing in the settling chamber when employing all of the selective solvents commonly used, such as sulfur dioxide, sulfur dioxide-benzene, chlorex, phenol, furfuraldehyde, nitrobenzene, and many other experimental solvents, and have noted that in the case of each of the aforementioned solvents, the extract constitutes the continuous phase, whereas the raffinate is in the form of the dispersed phase. In other words, at the completion of the mixing period and the beginning of the settling period, the raffinate or oil phase is emulsified or dispersed in the solvent phase and the mechanism of settling or stratification into two layers corresponds to the rising upward and agglomeration of the raffinate droplets.

I have observed that for the process of raffinate separation to go to completion under these circumstances very long periods of settling time are required and in the design and operation of commercial solvent treating plants, it is extremely doubtful whether perfect settling of the raffinate out of the extract layer is ever accomplished. The larger droplets of raffinate generally rise or settle upward out of the extract layer at a fairly rapid rate, but on account of the fact that the rate of settling is generally proportional to the square of the diameter of the particles being settled, it is easy to understand why the very small sized droplets of raffinate require longer times for settling out of the extract than can be allowed in commercial practice. The net result is a certain amount of loss of raffinate or paraffinic constituents along with the extract phase, simply on account of mechanical contamination, in addition to any losses which may be experienced on account of true solution of the paraffinic constituents in the extract layer. This loss may amount to as much as 15 to 20% of the final yield of raffinate. As a remedy for this situation, I have devised the following principle which I have found to be operable.

Briefly, this new principle consists in choosing a suitable solvent and treating conditions which will reverse the order of the phases going to the settling zone so that the raffinate or oil phase constitutes the continuous phase and the solvent or extract phase is the one which is dispersed. The process of settling then consists of the dispersed particles of extract phase agglomerating and settling out of the raffinate. In other words, the only manner in which a distinct layer of extract phase can appear is for droplets of extract phase to agglomerate to give a continuous layer of uniform composition. In this manner it is impossible for the extract layer to contain raffinate entrained. Therefore when the extract layer is removed from the settling zone, there is absolutely no danger of withdrawing even a small amount of raffinate. If from practical considerations only a limited settling time is allowed, the raffinate phase will be contaminated with a small amount of dispersed extract phase, but on account of the fact that the extract phase represents more or less dilute solutions of naphthenic fractions in solvent, the only harmful result which can be experienced is the failure to obtain the full degree of refinement which would be obtained if the settling of the two phases were one hundred percent perfect. While properly adjusting treating conditions and solvent ratios, the required degree of refinement can be obtained and the deleterious effect of contamination of the raffinate with a small amount of the extract phase can be reduced to a negligible quantity.

In other words, by utilizing the novel principle of making the extract the dispersed phase rather than the continuous phase in solvent extraction, I am able to prevent losses of raffinate along with the extract and thereby obtain a very substantial improvement in yield.

As a practical example of the operation of this principle, I have found that I can use pyridine in contact with an aqueous solution of alkali, such as sodium or potassium hydroxide. In the presence of aqueous alkali, a very unexpected phenomenon occurs. After the mixture of solvent, oil, and alkali is thoroughly mixed to insure equilibrium between phases, and the mixture is then passed into the settling zone, the separation of phases is rather slow for a few moments and then there is a rather rapid movement of the droplets of the solvent phase, followed by agglomeration of these droplets into a continuous layer of uniform composition, free from entrained raffinate. With additional settling time, the raffinate layer is almost entirely free of entrained extract and alkali, and I then have three distinct layers: namely, the oil or raffinate layer containing only a small amount of minutely dispersed extract phase, a homogeneous, continuous extract phase, and an aqueous alkali phase. The settling vessel is arranged for the continuous introduction of the equilibrium mixture and decantation of the three layers at appropriate levels. The raffinate layer is then passed up to the next treating stage, while the extract layer is passed down to the next treating stage in the conventional countercurrent system of solvent treating. The aqueous alkali phase may be passed either up or down the system or returned to the mixer connected with the same settling stage. The mechanism of the phenomenal behavior obtained with the solvent in the presence of aqueous alkali has not been definitely established and I do not wish to limit my invention to any theory, but it appears probable that I have been successful through the use of the aqueous alkali in changing the surface tension relationships to cause the desired reversion of phases in the equilibrium solvent-oil mixtures going to the settlers.

As an example to illustrate the efficiency of the results obtained, a sample of dewaxed California Santa Fe Springs distillate, classified as an S. A. E. 20 stock, having an A. P. I. gravity of 19.8 and 74 seconds Saybolt Universal viscosity at 210° F. was agitated with two volumes of pyridine at 70° F. The solvent and oil were found to be entirely miscible and no phase separation could be obtained. The mixture was then divided into two parts which were treated as follows: To the first part about 5% of water, based on pyridine content of the mixture, was added with additional agitation. This mixture then showed a separation of two phases with the usual condition of the raffinate phase being emulsified or dispersed in the solvent phase. Settling under these conditions required the usual long periods of time for efficient phase separation. To the other portion of the mixture, 5% of aqueous sodium hydroxide solution containing approximately 10% by weight of alkali, was added with agitation and the mixture allowed to remain quiescent. It was immediately evident that the raffinate was now the continuous phase and that the extract phase was dispersed therein. Within less than a minute, however, the extract phase began to agglomerate and settle out so that after only ten or fifteen minutes total settling time the extract phase could be separated practically quantitatively. The gravities and yields of oil obtained under the two conditions were 68% of 25.2 gravity raffinate with the experiment with water only, and 76% of 25.1 gravity raffinate when alkali was used.

I have found that many selective solvents can be made to behave or function like pyridine by the addition of or blending pyridine with such selective solvents giving the blended solvent improved properties over its components.

For example, if pyridine is added to and blended with nitrobenzene, aniline, chloraniline and many other selective solvents, such mixtures will not be selective solvents but will behave like pyridine and will be miscible solvents in which oils will be dissolved without stratification under working conditions in use as described herein.

Furthermore, such mixtures will take on most of the characteristics of pyridine when used as herein described. Certain other benefits are also shown in the use of such mixtures, such as improvement in filtering rate in dewaxing and selectivity in fractionating by stratification.

I have also observed that other selective solvents can be made to behave like pyridine in the presence of aqueous alkali, particularly when such solvents are blended with pyridine. For example, nitrobenzene, aniline, chloraniline and many other conventional selective solvents become susceptible to reverse the state of emulsion when blended with pyridine and aqueous alkali. The ratio of such solvent to pyridine may be varied over wide limits without impairing this characteristic.

While pyridine and aqueous alkali produce a complete break of the two oil phases and of the alkali phase within a relatively short time, it was observed that the above selective solvents accelerate and improve further the stratification of all three phases. This no doubt is due to the higher specific gravity of these compounds relative to pyridine.

Nitrobenzene, as is well known to those skilled in the art of solvent refining, is a very effective selective solvent. High quality raffinates can be produced when using this solvent with a comparatively small solvent-oil ratio. However, the yield of finished raffinate is rather low when comparing nitrobenzene treatment with other selective solvents of the conventional type wherein the raffinate emulsifies in the extract phase. Pyridine when applied in the presence of aqueous alkali gives considerably higher yields, based upon the same degree of refinement, than any of the conventional solvents, but requires (relative to such solvents as, for example, nitrobenzene, aniline, chloraniline, etc.) larger quantities of solvent.

I have observed that very efficient blends of nitrobenzene, aniline, etc. with pyridine can be prepared which will have all advantages and none of the disadvantages of their individual components.

As an example I have found that such blended solvents require about one-half the amount of total solvent to attain a specific degree of refinement as compared to pyridine by itself while the same high yields of finished raffinate are obtained as would be the case were pyridine used exclusively. It is understood, however, that such blended solvents are applied simultaneously with aqueous alkali as has been explained in detail.

The following experimental data shall serve to illustrate this point. A vacuum distilled, dewaxed, over-head lube oil stock of 22.3 A. P. I. gravity required 190 vol.% of nitrobenzene to produce a 28.5° A. P. I. gravity raffinate with a yield of 42%.

The same degree of refinement using pyridine and aqueous alkali was attained using 380 vol.% of pyridine, based upon the oil charged, with a yield of 54.5%.

A blend of 40% nitrobenzene +60% pyridine when applied to the oil in contact with aqueous alkali, required 200 vol.% of solvent to produce a 29° A. P. I. gravity raffinate with a yield of 53.8%.

The extractions in all cases were carried out in two steps, using equal volumes of solvent in each step.

Extractions with mixed solvents were carried out as follows:

1st extraction—40% nitrobenzene +60% pyridine using a 1 to 1 solvent oil ratio.

2nd extraction—using pyridine only.

This procedure was adopted for the following reason:

Many solvents, particularly nitrobenzene and aniline, show a tendency to discolor the raffinate during solvent recovery operations. It is conventionally assumed that this phenomenon is due to the formation of dye-compounds, in the above cited case, as probably aniline-block, formed by reduction of nitrobenzene. While nitrobenzene is not readily reduced, it is susceptible to reduction to aniline which in turn will show a great tendency to discolor the oil at higher temperatures.

I have observed that such discoloration can be avoided when conducting the final extraction with pyridine. To all appearances, the pyridine removes the nitrobenzene or aniline into the extract phase leaving thereby the raffinate essentially free of such color detrimental reagents.

As part of my invention I intend to contact the "mixed-solvent refined oil" in its final step of treatment with pyridine exclusively for the purpose of selectively removing such solvent components as are detrimental to color during solvent recovery topping operations. This final pyridine treating step may be accomplished in any convenient manner, for example, by means of a counter-current treating tower. When using more stable selective solvents, for example, chloraniline, the extraction may be carried to completion with the solvent mixture but in any event a pyridine wash may be applied if such solvents contain contaminations of color forming constituents.

I have further observed that all solvents that are susceptible to reversal of emulsion as described herein and also all modified solvents when applied in the presence of aqueous alkali produce a markedly light colored raffinate that may require no clay treatment whatsoever. Blank runs without any aqueous alkali produced mostly opaque raffinates and as part of my invention I claim the removal of color bodies or intermediate color forming constituents into the extract phase, leaving a light colored raffinate that requires no further treatment for improvement of color.

While it is convenient and efficient to use nitrobenzene or aniline as auxiliary selective solvents with pyridine, I prefer to use chloraniline since this compound is the most stable and shows a slightly more favorable color improvement of the finished raffinate.

Many modifications in regard to the auxiliary selective solvents suitable for use with pyridine may be made by those skilled in the art without deviating from the basic principle of this invention.

I have also found that substituted pyridines such as, for example, methyl pyridines or picolines, may be used instead of pyridine; further, all aliphatic amines can serve the purpose of emulsion reversal and/or may be substituted for pyridine.

Another step of my invention relates to the use of solvent blends, consisting of mixtures of pyridine with nitrobenzene, aniline, chloraniline and similar substituted ring compounds, as a dewaxing medium, where, as is well known, a wax "anti-solvent" is necessary, i. e., a substance having much greater solvent power for oil than for wax. The application of such solvent mixtures to a waxy lube-oil-stock preliminary to solvent refining operations produces remarkable results as will be explained in the following description of dewaxing operations.

As a further use of pyridine, I have discovered that this solvent either alone or in combination with auxiliary solvents to be classified and enumerated hereafter, can also be used to separate wax from lubricating oil. When this solvent is used in the anhydrous condition in the proportion of, say 1½ volumes of pyridine to one volume of waxy lubricating stock, I find that it is completely miscible with the oil components of the lubricating stocks from certain crudes down to temperatures as low as −10 or −15° F. Such stocks showing complete miscibility with the anhydrous solvent are generally those from mixed base crudes or low viscosity stocks from paraffinic crudes. In other words, complete miscibility of the solvent with the oil fractions is more apt to be obtained with low viscosity stocks and stocks of a lower degree of paraffinicity (viscosity index) than with stocks of high molecular weight and a high degree of paraffinicity. With such stocks as are miscible with the solvent at the dewaxing temperature which is found necessary to give the desired pour point of the finished oil, the dewaxing operation consists briefly in chilling the solvent-oil mixture to the necessary temperature and then separating the precipitated wax by filtering, settling, centrifuging, or electrical deposition. The rates of chilling may be as fast as two or three degrees Fahrenheit per minute and the precipitated wax is in easily filterable form conducive to high filter rates and efficient washing of the wax cake on the filter. Leaf-type filters can be employed but the use of continuous drum-type filters with washing of the wax cake with a small amount of chilled solvent is preferred. The wash liquid is preferably used as make-up solvent for a succeeding batch of stock. However, the wash liquid may be applied at a higher temperature than that pertaining in the filtering operation, and in that case not only further de-oiling of the wax cake is obtained, but also some fractionation of the wax analogous to sweating is obtained and it is then desirable to handle the wash liquid separately to recover the mixture of oil and intermediate waxes to avoid building up too high concentrations of intermediate waxes in the incoming stock.

In the case of stock in which the oil components are not entirely miscible with the solvent at the desired dewaxing temperature, I have discovered that I can improve the procedure in either of two ways by employing one or more auxiliary non-selective solvents or combinations thereof to obtain complete miscibility and avoid separation of a raffinate phase which would contaminate the wax cake and result in large losses of raffinate along with the wax. Method A consists in adding to the oil, solvent, or mixture thereof, a relatively small amount of an auxiliary non-selective solvent, such as benzene, toluene, xylene, carbon tetrachloride, chloroform, ethylene dichloride, trichloroethylene, dichlorodifluoroethane, cyclohexanols, cyclohexane, normal hexane, butyl, pentyl, hexyl, and higher alcohols, and any other volatile solvent which is mutually soluble in both the oil and the pyridine. The auxiliary non-selective solvents in this method are all volatile solvents which can be recovered by distillation of the filtrate or a fraction obtained from the filtrate by a subsequent operation to be explained below. These auxiliary non-selective solvents have the power of preventing the occurrence of raffinate phase separation at the dewaxing temperature when used in the proper amounts, depending upon the extent to which the miscibility temperature of the mixture needs to be lowered. With some of the auxiliary non-selective solvents, such as toluene and hexane, it is necessary to chill to a lower temperature than would otherwise be required, on account of the higher solvent power of these materials for wax as compared to pyridine. With solvents of the oxygenated type, however, such as cyclohexanol and the higher alcohols, the change in the necessary dewaxing temperature is not so great and may be entirely negligible with the better solvents of this class.

I use the term "pyridine-type solvent" to refer generally to the solvents applicable to my process as described below, namely, pure or commercial pyridine alone, or substituted pyridines (such as methyl pyridine), and to blends of these substances with the auxiliary solvents named.

Method B consists in lowering the miscibility temperature by enriching the feed stock or the mixture of solvent and oil with an appropriate amount of aromatic, naphthenic type oil of comparatively low A. P. I. gravity. These low gravity oils have high boiling points and are preferably obtained as extracts from the lubricating oils being processed, but if desired they may come from any other convenient source. A very practical method of operation is to recycle extract from a previous batch of the same grade of stock into the chilling chambers. In fact, when the extract is produced by adding aqueous alkali to the filtrate phase, as explained below, a portion of the extract phase containing a full quota of solvent can be recycled without the necessity of distilling the solvent as an intermediate step. With this method of operation at hand, it is possible to dewax lubricating stocks of any molecular weight or degree of paraffinicity without resorting to the use of another auxiliary non-selective solvent as disclosed under Method A.

Following the filtering or centrifuging step in which the separated wax is removed mechanically from the chilled mixture, the filtrate is then admixed with a small quantity of oil antisolvent which will cause a separation of the filtrate into two phases. The principles involved in this step are the same as those described in my copending application Ser. No. 84,163 wherein solvent treating with pyridine modified by the addition of aqueous alkali is described in a method of extraction involving reversal of the dispersion of the extract and raffinate phases one in the other. In other words, by the addition of small amounts of aqueous alkali to the filtrate, I can now alter the miscibility relationships to obtain the separation of a raffinate phase and an extract phase so that solvent refining of a lubricating oil stock is obtained with the same solvent which has been employed as a diluent and wax precipitant during the dewaxing step. This combination obviously gives a very efficient, economical operation.

In causing phase separation to occur by adding a modifier to the filtrate, I can proceed along conventional lines by adding water or alcohol which gives the usual conditions of the raffinate phase being emulsified with the solvent phase, but I prefer to proceed along the more efficient method which I have described above in which the alkali addition agents are employed to yield the raffinate as the continuous phase and the extract as the dispersed phase prior to settling. As alkaline reagents, I may use aqueous solutions of sodium hydroxide, potassium hydroxide, or alcoholic solutions of potassium hydroxide, or alkali alcoholate.

In the chilling of the mixture of solvent and waxy lubricating stock preparatory to filtering or centrifuging, I may use conventional chilling equipment, such as the Vogt or Carbondale chillers employing brine or liquid ammonia as an indirect refrigerant, or I may employ a normally gaseous material such as ammonia or propane, butane, and the like, as a direct refrigerant by introducing these materials into the chilling mix, and permitting them to evaporate. Ammonia is particularly useful for this purpose, but it is not desirable to permit too high concentrations of ammonia to become dissolved in the oil-solvent mixture because of the antisolvent effect of the ammonia which might result in raffinate phase separation.

I have also observed that mixtures of pyridine with nitrobenzene, aniline, chloraniline and related compounds commonly used as auxiliary selective solvents, show a much greater antisolvent power for wax than pyridine by itself. I have investigated a solvent mixture of this type in regard to filtration and chilling rates and have found that the addition of such selective solvents improves both filtration and chilling characteristics. It was also noted that extremely dry and oil-free filter-cakes can be obtained with great ease. The wax cake has a very light color, is of crystalline nature and forms a spongy mass which is exceptionally susceptible to a solvent wash for the purpose of producing a white, oil-free wax cake. Very small quantities of solvent are required to wash the wax cake. Contrary to mixtures of pyridine with such auxiliary non-selective solvents as benzol, toluene, xylene, di- and tri-chlorethylene, chloroform, carbon tetrachloride and many other conventional compounds, which are now used as dewaxing mediums, either by themselves or mixed with other solvents, mixtures of pyridine with nitrobenzene, aniline, chloraniline and similar selective compounds produce a mixed solvent which shows a greater anti-wax solvent power than either pyridine alone or any combination of pyridine with any of the first named group of solvents. For example, mixtures of pyridine with such solvents as benzol, toluene, xylene, etc. produce an oil, after dewaxing, which shows a much higher pour point or cold test than the temperature at which the solvent-waxy-oil-mix was filtered. Straight pyridine by itself is capable of producing an oil which has about the same cold test as the temperature of filtration.

Mixtures of pyridine with such solvents as nitrobenzene, aniline and chloraniline on the other hand are capable of producing dewaxed oils having a cold test of as much as from 20 to 40° F. below the temperature of filtration. It will, therefore, be evident that it is possible to obtain low cold test oils without the necessity of extreme refrigeration. The degree of pour point depression depends however upon the type of oil treated and also upon the degree of solvent refining that is to follow the dewaxing operation. For example, a Mid-Continent waxy lube-oil stock having a pour point of 105° F. and a gravity of 23.5° A. P. I. was treated by dissolving it in a mixture of 40% nitrobenzene and 60% pyridine, using a 1 to 1 solvent-waxy-oil ratio, chilling the solution to +45 to 50° F., and filtering it at this temperature. The filtrate was then solvent extracted by adding a small quantity of aqueous alkali which caused a rapid separation into two oil phases and an aqueous alkali phase. A second extraction of the raffinate phase was carried out using an additional 100 vol.% of pyridine only, based upon the original oil charge, thereby removing the nitrobenzene from the raffinate solution. The raffinate solution was then freed from solvent by distillation and gas stripping. The raffinate, after solvent recovery, showed a 5 N. P. A. color, a 29° A. P. I. gravity and a pour point of 15° F. The yield of finished raffinate was above 50%. When using nitrobenzene or aniline as selective solvents in conjunction with my pyridine-type solvent as just explained, I contact the dewaxed oil solvent solution with aqueous alkali to produce two oil phases, namely, a raffinate solution and an extract solution, and a separate aqueous alkali phase; and I then prefer to wash the raffinate solution so obtained with an additional quantity of pyridine only in order to remove thereby, from said raffinate solution, the nitrobenzene or aniline completely which otherwise would tend to deteriorate the quality of the raffinate oil during solvent recovery by distillation.

It is known that the pour point increases with increase in paraffinicity of the raffinate, since solvent refining throws into the raffinate phase any traces of wax remaining in the filtrate. Other stocks of waxy oils were treated in a like manner with mixtures of nitrobenzene, aniline and chloraniline with pyridine, but the pour point of the finished raffinate was not quite as low as had been observed when treating the Mid-Continent stock. However, all oils that were dewaxed with such modified solvents showed a pour point many degrees below the temperature of filtration. When pour points are based upon the total filtrate and not upon the solvent refined raffinate, the cold test of such topped filtrates is depressed, on some oils, as much as from 20 to 40° F. below the filtration temperature. In any event I have found that it is possible to produce a finished high quality raffinate from a waxy stock, filtered at from +45 to 50° F., having a low enough residual wax content to become susceptible to conventional pour point depressing agents, such as, for example, Paraflow. It is well known to those experienced in the art that oils having a wax content of above 1% cannot economically be treated with pour point depressors.

Nitrobenzene has been cited in the art as a dewaxing solvent as well as a selective solvent, however, any attempt to use nitrobenzene during the dewaxing stage results in filtration difficulties due to the formation of two phases, namely, a raffinate phase in which the precipitated wax is suspended and an extract phase which is essentially free of wax. Such a system is always difficult to filter. Addition of auxiliary non-selective solvents such as, benzol, toluene, xylene etc. prevents this phase separation to some extent by lowering the miscibility temperature but any such modification results in a decrease of oil-wax selectivity which requires consequently lower chilling and filtration temperatures.

When such a solvent is now blended with an anti-wax solvent such as pyridine the miscibility temperature is also lowered but instead of decreasing the wax-oil selectivity, this preferential solution phenomenon is increased, producing thereby a most efficient anti-wax solvent which simultaneously shows high solvent power for the oil constituents.

The lowering of the miscibility temperature depends upon the amount of auxiliary selective solvents used. For example, when using the previously described Mid-Continent stock it was possible to chill the mixture down to +45° F. when using a 40-60 nitrobenzene pyridine blend. With less nitrobenzene lower miscibility temperatures are obtained. Chloraniline permits somewhat lower filtration temperatures than nitrobenzene and I prefer to use chloraniline as auxiliary selective solvent for reasons previously described under the heading solvent refining. The extent of miscibility depression depends also upon the type of oil to be treated, for example, more naphthenic constituents show lower miscibility temperatures, paraffinic oils show higher miscibility temperatures. If a highly paraffinic type of oil is to be dewaxed it may be desirable to lower the miscibility temperature by blending this type of oil with extract from the solvent refining operation (either solvent-free extract or extract-solvent mixtures) for the purpose of lowering the miscibility temperature, to obtain the highest possible performance during dewaxing operations, said extract being a representative of the class of auxiliary non-selective solvents.

I have also observed that it is possible to chill a waxy-oil solvent mixture, which is capable of forming two phases at a lower temperature, to any desired low temperature, followed by a gradual warming up period up to a point at which filtration becomes efficient. I have observed that such a filtrate has a much lower pour point than an oil that was chilled down to the same filtration temperature without super-cooling. I believe that this phenomenon can be explained as a function of time relative to redissolving the precipitated wax.

From my processes relating to both solvent refining and dewaxing operations it becomes apparent that pyridine when used in mixture with such auxiliary selective solvents as nitrobenzene, aniline, chloraniline and many other similar compounds becomes a much more efficient solvent for dewaxing hydrocarbon oils and, if used in presence of a separate aqueous alkaline phase, also for solvent refining operations. Compared with other methods of solvent refining and dewaxing operations a high grade low pour point raffinate can be produced with extremely low solvent oil ratios at a high yield of finished raffinate. Further, the same solvent blend is used for both operations, and neither the wax recovered nor the raffinate produced will require any further chemical treatment such as acid and clay to produce marketable products. The wax cake can be washed water white, preferably with pure pyridine, or a mixture of chloraniline and pyridine, if chloraniline is the preferred auxiliary selective solvent, in order to avoid darkening during solvent recovery operations.

While the processes and methods described herein may be applied to dewaxing and extracting oils, it will be seen that the same procedure can be adopted for the purpose of "de-oiling" wax cakes obtained from other conventional processes without deviating from the spirit of this invention.

I have also investigated the method of removing pyridine from a raffinate by such means as treatment of the raffinate with an equivalent quantity of acids capable of forming salts with the pyridine, for example, sulfuric acid, which reacts to form a hydrosulphate of pyridine, followed by liberation of the pyridine for the purpose of recovering said reagent, by addition of a stronger base by means of double decomposition.

Another modification thereof consists of extracting the pyridine from the raffinate by means of sulfur dioxide if such a reagent is available and recovering the pyridine from the sulfur dioxide extract by distillation of the $SO_2$. It is understood that the raffinate is already so highly refined that liquid sulfur dioxide exerts no selective fractionation upon the raffinate, said sulfur dioxide being used exclusively for the purpose of pyridine removal from the raffinate without infringing upon the art cited in the Edeleanu process.

If oils of lower molecular weight and lower boiling points are to be treated it becomes apparent that many effective conventional solvents cannot be applied on account of difficulties encountered when attempting to separate the oil from the solvent by distillation. Pyridine with or without the specified auxiliary solvents, can be applied to such oils much more conveniently since the pyridine has an exceptionally low boiling point when compared with many other solvents.

In case that the auxiliary selective solvents, nitrobenzene, aniline or chloraniline are used, the previously described procedure of a final pyridine extraction is resorted to, to produce a final raffinate essentially free of said high boiling auxiliary selective solvents.

Some of the conventional solvents have been known to impart a corrosive action to the finished raffinate due to remaining traces of solvent of a corrosive nature or due to decomposition of some of the reaction products formed between solvent and raffinate which are retained in the finished oils. Since most of these detrimental compounds are of an acidic nature it is evident that such oils may bring about corrosive action upon the parts of internal combustion engines, for example, particularly at the elevated temperatures now encountered with modern high speed motors.

I have observed that such corrosion is not encountered when solvent refining the oil according to my processes. Any remaining traces of pyridine in the finished raffinate would have exactly the opposite effect since this compound is used as a corrosion inhibitor.

I, therefore, disclose this beneficial effect as a means of producing a motor oil of the highest quality of the anti-corrosive type. I also disclose the method of washing any solvent treated oil, that might be susceptible to corrosive reactions while used as a lubricant for internal combustion engines, with pyridine for the purpose of removing any and all traces of such corrosive solvents or reaction products thereof.

The alkaline reagents which are suitable for the purposes of my invention as described above may be expressed by the term "alkaline solution" which is to be understood to include the water or alcohol solutions of the hydroxides of the alkali metals, and the alkali metal alcoholates.

I claim:

1. The method of refining hydrocarbon oil comprising dissolving the oil in pyridine-type solvent, removing precipitated wax, contacting the oil solution from which the wax has been removed with an aqueous alkali solution of such volume and concentration as to form a separate alkaline layer in equilibrium with the oil and solvent and to cause the oil to separate into two liquid phases of which the phase containing the more naphthenic and aromatic components of the oil is dispersed in a continuous menstruum of the phase containing the more paraffinic components of the oil.

2. A method of treating hydrocarbon oils comprising dewaxing the oil with a pyridine-type solvent and then without removing the solvent from the dewaxed oil adding an aqueous alkali solution in sufficient volume and strength to operate as a solvent modifier capable of converting the solvent present in the dewaxed oil into a selective solvent and color removing agent and separating the mixture into three component parts, namely, raffinate, extract and alkali solution and then separating said components and recovering the solvent from the raffinate and extract.

3. The method of refining petroleum oil comprising dissolving the oil in pyridine-type solvent, chilling the solution to precipitate wax, removing the wax, contacting the wax-free oil solution with an aqueous alkaline solution not wholly soluble or chemically reactive with said solvent and of such strength and volume as will cause the separation of the oil into a more paraffinic fraction and a less paraffinic fraction immiscible therewith.

4. The method of removing wax and oil fractions of low viscosity index from petroleum oils comprising forming a homogeneous solution of the oil in a pyridine-containing solvent, cooling the solution to a point at which solid wax is precipitated, removing precipitated wax therefrom, contacting with the solution a sufficient quantity of alkaline solution to (1) cause the oil-solvent solution to separate into two liquid phases, and (2) form in equilibrium therewith a separate alkaline solution phase.

5. The method of treating petroleum oil to remove wax and low viscosity index constituents comprising blending the oil with a low viscosity index extract from petroleum oil, dissolving the blend in a pyridine-type solvent, precipitating and removing wax from said solution, then without removing contained solvent contacting therewith sufficient aqueous alkaline solvent to separate the oil into a raffinate layer and an extract layer and to constitute a separate liquid phase of alkaline solution in equilibrium therewith.

6. The method of removing substantially all of the wax from wax-bearing petroleum oils comprising dissolving the wax-bearing oil in a substantially anhydrous pyridine-type solvent, blending said mixture with a selective solvent in such proportion that no phase separation can occur at the desired filtration temperature, chilling said mixture to precipitate the wax and removing said wax from the anhydrous oil-solvent mixture.

7. The method of refining wax obtained from petroleum oils which comprises dissolving the wax in an anhydrous pyridine-type solvent which is miscible with the oil contained in the wax down to temperatures as low as $-15°$ F., chilling said mixture to the desired chilling temperature not lower than $-15°$ F. to precipitate the wax without causing separation of the oil into two liquid phases, and removing said precipitated wax from the oil-solvent mixture.

8. The method of producing a low pour-point oil from wax bearing petroleum oil comprising dissolving said wax bearing petroleum oil in an anhydrous pyridine-type solvent, chilling the solution to −10° F., whereby the wax present is precipitated and is obtained as a solid phase, and at which temperature the oil-solvent mixture exists as one liquid phase, and removing said wax from said oil-solvent mixture.

9. The method of producing a low pour-point oil, from wax bearing petroleum oil, comprising dissolving said wax bearing petroleum oil in an anhydrous pyridine-type solvent, miscible with the wax bearing oil down to temperatures as low as −15° F., and which does not produce a separation into two liquid phases at said temperature, chilling the solution to the desired low temperature whereby substantially all of the wax present is precipitated, and removing said wax from said oil solvent mixture.

10. The method of producing low pour-point oil from wax bearing petroleum oil comprising dissolving said wax bearing petroleum oil in an anhydrous pyridine-type solvent which is miscible with the oil down to temperatures as low as −15° F., chilling the solution to the desired low temperature whereby substantially all the wax present is precipitated and at which temperature the oil-solvent mixture exists as one liquid phase, and removing said wax from said oil-solvent mixture.

11. The method of removing substantially all of the wax and the oil fractions of low viscosity index from wax-bearing petroleum oils comprising dissolving the wax-bearing oil in a substantially anhydrous pyridine-type solvent which is miscible with the oil down to temperatures as low as −15° F., blending said mixture with a selective solvent in such proportion that no separation into two liquid phases can occur at the desired filtration temperature, chilling said mixture to precipitate the wax, removing said wax from the anhydrous oil-solvent mixture, then without removing contained solvent contacting therewith sufficient aqueous alkaline solution to separate the oil-solvent mixture into a raffinate layer and an extract layer and to constitute a separate liquid phase of alkaline solution in equilibrium therewith, separating the phases from each other and recovering the solvents therefrom.

12. The method of removing substantially all of the wax and the oil fractions of low viscosity index from wax-bearing petroleum oils according to claim 11 in which the selective solvent is nitrobenzene.

13. The method of removing substantially all of the wax and the oil fractions of low viscosity index from wax-bearing petroleum oils according to claim 11 in which the selective solvent is aniline.

14. The method of removing substantially all of the wax and the oil fractions of low viscosity index from wax-bearing petroleum oils according to claim 11 in which the selective solvent is chloraniline.

15. The method of removing substantially all of the wax and the oil fractions of low viscosity index from wax-bearing petroleum oils comprising dissolving the wax-bearing oil in a substantially anhydrous pyridine-type solvent, blending said mixture with a selective solvent in such proportion that no separation into two liquid phases can occur at the desired filtration temperature, chilling said mixture to precipitate the wax, removing said wax from the anhydrous oil-solvent mixture, then without removing contained solvent contacting therewith sufficient aqueous alkaline solution to separate the oil-solvent mixture into a raffinate layer and an extract layer and to constitute a separate liquid phase of alkaline solution in equilibrium therewith, separating the extract and alkaline solution from the raffinate solution and extracting the latter further with a pyridine-type solvent of the group consisting of pyridine, pyridine-homologues and mixtures thereof in order to thereby remove the selective solvent from said raffinate solution, and recovering from the latter the pyridine-type solvent by distillation.

16. The method of removing substantially all of the wax and the oil fractions of low viscosity index from wax-bearing petroleum oils according to claim 15, in which the selective solvent is nitrobenzene.

17. The method of removing substantially all of the wax and the oil fractions of low viscosity index from wax-bearing petroleum oils according to claim 15 in which the selective solvent is aniline.

18. The method of removing substantially all of the wax and the oil fractions of low viscosity index from wax bearing petroleum oils according to claim 15 in which the selective solvent is chloraniline.

JAMES W. WEIR.